Patented Sept. 12, 1944

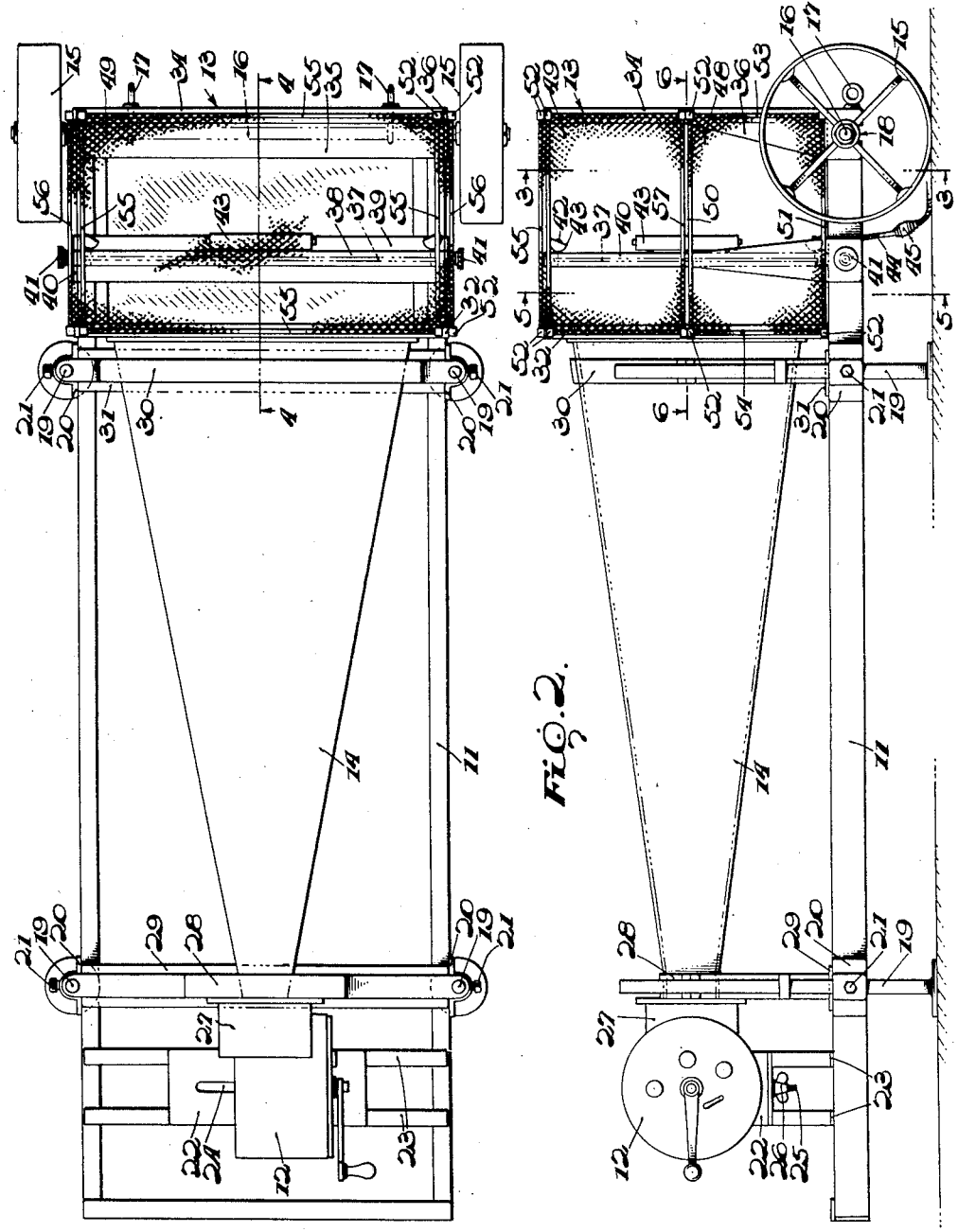

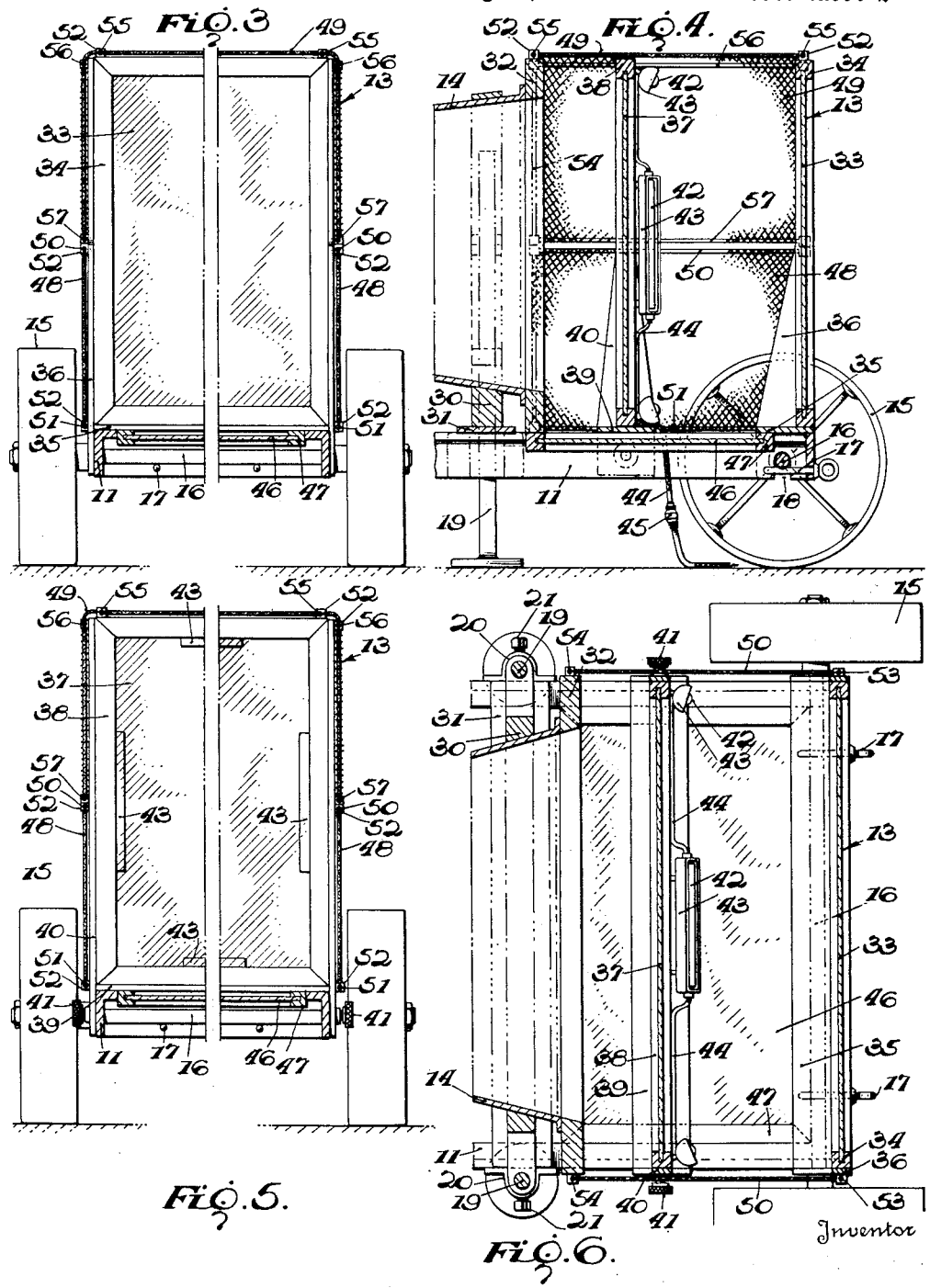

2,358,231

UNITED STATES PATENT OFFICE 2,358,231

APPARATUS FOR UNDERWATER PHOTOGRAPHY

Eldridge R. Fenimore Johnson, Gladwyne, Pa.

Application August 7, 1941, Serial No. 405,870

12 Claims. (Cl. 95—11)

This invention relates to underwater photography, and more particularly to a device for facilitating the photographing of marine fauna in their natural habitat.

It is seldom possible to photograph undersea fauna in their most attractive natural surroundings because of their tendency to retire out of sight into refuges or to swim away upon the approach of a photographer. Consequently, in order to obtain underwater pictures of high quality and beauty, particularly when using color film, it is necessary to catch the fish or other specimens to be photographed and place them in front of suitable underwater scenery under conditions which not only permit them to swim and act naturally, but also oblige them to remain within the field of view of the camera.

While an ordinary glass aquarium submerged in front of a suitable underwater scene might serve to confine the specimens to be photographed in the desired environment, such an expedient would immobilize the body of water within the aquarium and prevent it from partaking of the wave or current motion of the surrounding water, which would in turn cause the confined specimens to remain still in contrast with the seaweed and animal plants moving to and fro in the background, thereby producing an unnatural picture. Where underwater currents are present, detritus would rapidly accumulate in the lee of a conventional aquarium, cascade into the top thereof and swirl about in a most unnatural manner, thus further detracting from the quality of the photograph. Finally, and most important, many types of underwater fauna are unable to remain upright or in their normal attitudes unless they are permitted either to swim forward through a relatively stationary body of water, or to themselves maintain a relatively stationary position by swimming against the current. Since the body of water enclosed within an ordinary aquarium affords little room for actual forward swimming, it is highly desirable that specimens to be photographed be permitted to swim in water which is subject to normal current and wave conditions.

It is therefore one of the objects of the present invention to provide a novel device which will successfully confine marine fauna to be photographed in a predetermined position relatively to the camera and to the desired background while at the same time offering a minimum of interference with the transmission of current and wave motion from the surrounding water to that in which the specimens are confined.

Another troublesome condition encountered in making underwater photographs is the glare produced by the reflection of light both from the structure of the water itself and from foreign matter present in the body of water between the objects to be pictured and the camera. Although it is possible to partially eliminate this glare by means of polarizing plates and color filters, it has been found that much more satisfactory results can be obtained if substantially the entire body of water between the camera and the specimens is shielded or shaded from all light rays other than those travelling along lines which parallel or make only relatively small angles with the axis of the camera.

It is thus another object of the invention to provide an underwater photography device of the character described which embodies means for surrounding the space between the camera and the specimens confining chamber with a light-proof shield, which shield is also preferably so constructed and arranged as to be filled with water when in use so as to prevent the unequal refraction of rays entering the camera lens which would result were the interior of the shield to contain air instead of water, and were the outer end thereof to be closed by an optically non-flat transparent plate.

Due to refraction, substantially all of the natural underwater light comes from above and falls upon specimens to be photographed almost vertically, even when the sun is well away from the zenith. Inasmuch as this results in throwing the sides and underbodies of specimens into dense shadow and in continually varying exposure conditions as the specimens lean or turn toward and away from the camera, it is practically impossible to obtain high quality pictures under water by means of natural light, especially in the case of color photography where the matter of exposure is critical.

It is therefore a further object of the present invention to provide a device for use in making underwater photographs which embodies new and improved means for artificially illuminating the field of view of the camera and for confining the moving subjects of the picture within a limited area the lighting of which can be readily controlled by the photographer.

Still another object is to provide a device which combines in a unitary structure a camera support, an artificially lighted specimen container through which the surrounding water may freely circulate and a light shield intermediate the camera and container, which device can be maneuvered and adjusted for the taking of underwater photographs with a minimum of difficulty, and will insure retention of the camera, light shield and specimens to be photographed in properly aligned and spaced positions at all times.

Another object is to provide a novel underwater photography device which is of simple, rugged structure, can be readily handled and operated when submerged and enables the taking of clearer, more natural and more beautiful pictures of marine fauna than are obtainable with the devices now available.

These and other objects will appear more fully upon consideration of the following detailed description of that embodiment of the invention which is illustrated in the accompanying drawings. Although only one particular form of device is disclosed therein, it is to be expressly understood that these drawings are intended for purposes of illustration only, and are not to be construed as defining the full scope of the invention, which latter function is that of the appended claims.

Referring now to the drawings, wherein like reference characters indicate like parts throughout the several views:

Figs. 1 and 2 are plan and side elevational views, respectively, of one structurally simple form of device embodying the present invention, in each of which views part of the netting or mesh which encloses the top and two sides of the specimen chamber has been omitted in order to more clearly illustrate the interior construction; and Figs. 3, 4, 5 and 6 are sectional views of the device of Figs. 1 and 2 taken substantially on lines 3—3, 4—4, 5—5 and 6—6 of the latter, but with certain parts shown in full and others omitted in the interest of clarity.

In the form illustrated, the device of the present construction comprises an open rectangular main frame 11 made of either metal or wood, but preferably of aluminum, which is adapted to support in properly aligned and adjusted positions a camera 12, a rectangular specimen-containing chamber indicated generally as 13 and a hollow pyramidal light shield 14 enclosing the space between the camera and the specimen chamber and adapted to prevent light from entering the camera from any direction other than along its axis.

To facilitate movement and positioning of the device, the frame 11 is provided with a pair of wheels 15 mounted on an axle 16, the axle being removably secured to the frame in any desired manner, as by means of pins 17 which normally engage the underside of the axle and hold the latter in place in inverted U-shaped slots 18 formed in the frame side members. The frame is also fitted with two pairs of adjustable supporting legs 19 which are slidably mounted in brackets 20 adjacent the front and rear ends of the frame. The legs 19 may be secured in any desired adjusted position by means of set screws 21.

In order to properly support the camera 12 (which, of course, may be of any suitable construction and capable of taking either still or motion pictures), the frame 11 is provided with a camera platform 22 mounted on the frame by means of a pair of cross beams 23 and having therein a transversely extending slot 24 adapted to receive a threaded spindle 25 by which the camera may be rigidly fixed to the platform with the aid of a suitable wing nut 26. The slot 24 permits adjustment of the camera transversely of the frame so as to bring the lens housing 27 into proper registration with the rear end of the light shield 14 which is held in a supporting cradle 28 mounted on the frame 11 in any desired manner, as by means of a cross beam 29. The forward end of the light shield 14 is similarly supported by means of a cradle 30 and cross beam 31, and is also secured to a vertical rectangular frame 32 which rests on the side members of the frame 11 and serves to support the rear edges of the netting or mesh which encloses the top and sides of the specimen chamber 13.

The forward end of the chamber 13 is formed by a plate or pane 33 of glass, "Lucite" or other suitable transparent material mounted in a frame 34 of dimensions slightly larger than the field of view of the camera 12, the frame 34 being fixedly secured in vertical position to the main frame 11 in any suitable manner, as by a transversely extending horizontal base 35 and vertical side plates 36. The rear end of the specimen chamber is movable so as to vary the size of the space in which the specimens are to be permitted to swim, and comprises a second plate 37 of transparent material mounted in a vertical frame 38 which is in turn supported on a base 39 resting on, and slidable with respect to, the main frame 11. The side plates 40 which assist in securing the frame 38 to its base 39 extend downwardly to embrace the side members of the frame 11, and carry suitable set screws 41 for locking the frame 38 and pane 37 in any desired adjusted position.

I order to insure proper illumination of the specimens to be photographed, the adjustable rear end of the specimen chamber 13 may be provided with a source of artificial light. In the embodiment illustrated, four lighting units 42, preferably of elongated tubular construction and including suitable reflectors 43, are fixed to frame 38 so as to be movable therewith and provide lighting of uniform, controllable intensity both for the interior of the specimen chamber and for the underwater background which is to be photographed through the forward transparent plate 33. The lighting units 42 may be of any suitable waterproof constructions interconnected by a cable 44 likewise mounted on and movable with the frame 38 and having at its free end a watertight connector 45 through which connection may be made to any suitable source of current.

The bottom of the specimen chamber 13 is preferably formed by a third transparent plate or pane 46 mounted in a frame 47 which may be secured, either permanently or temporarily, to the main frame 11 in any desired manner, as by connection to the bottom of light shield frame 32 and to the base 35 of front frame 34. Although the bottom of the chamber might be closed in various other ways, the use of a transparent plate enables the placing of a supplementary source of illumination thereunder when desired.

As previously indicated, the top and sides of the specimen chamber are formed of netting or mesh so as to permit a free flow of water through the space in which the specimens are confined between the front and rear transparent plates 33 and 37. The netting may be conveniently divided into two lower side panels 48 and a middle panel 49 covering the top and upper side portions of the chamber. Each of the lower side panels 48 may be secured in place by lacing its upper and lower edges to horizontally extending rods 50 and 51, respectively, which are mounted in suitable brackets 52 fixed to the vertical side edge of light shield frame 32 and to side plate 36 of front frame 34, and by lacing the side edges of said panel to vertically extending rods 53 and 54 which are similarly mounted on the side plate 36 and edge of frame 32, respectively. The central portion of the middle panel 49 closing the top of the specimen chamber is similarly secured to a rectangular framework of rods 55 mounted on the upper edges of the frames 32 and 34, while the two extremities of said panel covering the upper halves of the chamber sides are firmly secured at top and bottom to rods 56 and 57, respectively, but loosely laced around the upper halves of vertical rods 53 and 54. The two rods 57 are slidably mounted on the vertical rods 53 and 54 so that the netting at either side of the specimen chamber may be raised to provide access to the interior thereof, as when introducing or removing the specimens of marine fauna which it is desired to photograph.

In using the device of the present invention, the camera 12 is mounted on and secured to the platform 22 in proper association with the rear end of the light shield 14, the supporting legs 19 are adjusted to approximately the positions in which it is expected that they will be used, and the movable frame 38 is slid forwardly well away from the large end of shield 14 so that air may readily escape from the latter and be replaced by water, all before the device is submerged. The whole assembly is then put overboard and lowered to the bottom of the sea, whereupon it may be wheeled by a diver (or by a wader in shallow water) into photographing position in front of an attractive group of coral or other submarine scenery of the character which it is desired to photograph as background. If necessary, the pins 17 may be removed so as to permit detachment of the wheels 15 and axle 16, leaving the frame 11 supported entirely on the legs 19, thereby enabling the frame to be set closer to the bottom than when the wheels and axle are in place.

After the main frame 11 has been placed in the desired location, anchored, if necessary, by suitable weights and adjusted by means of the legs 19 to properly direct the focal axis of the camera, the movable frame 38 is adjusted so as to vary the size of the specimen chamber and thereby restrict the movements of the specimens of undersea fauna which are to be photographed according to their size or other characteristics. The specimens are then customarily introduced into the chamber by lifting one of the rods 57 and the attached extremity of the middle netting panel 49, the lighting units 42 are turned on, and the device is ready for taking pictures. If desired, the illumination provided by lighting units 42 may be supplemented by other portable lights placed under the transparent bottom plate 46 of the chamber, or at the sides thereof and directed either into the chamber itself or at the background which is to be photographed through the front plate 33.

There is thus provided by the present invention a device of simple, yet novel, construction which greatly facilitates the making of underwater photographs, particularly when it is desired to photograph marine fauna in color and in attractive natural surroundings. By constructing the specimen chamber in the manner described, the specimens are permitted to swim and act naturally, while at the same time their movements may be restricted as desired so as to keep them within the field of view of the camera and in an area which is uniformly and properly illuminated by the artificial lighting units which constitute part of the device. The provision of the light shield extending between the camera and the specimen chamber eliminates the undesirable haze-forming glare which is customarily encountered in ordinary underwater photography because of reflection of light into the camera lens from all directions due both to the structure of the water and to the presence therein of foreign matter, including plankton and detritus, while the body of water which is within the light shield prevents any unequal refraction which might be caused by the use of glass plates for the ends of the specimen chamber which are not optically flat. Still another advantage of the apparatus of the present invention is that, by mounting the entire assembly of camera, light shield and specimen chamber on a unitary frame, the various elements may be properly aligned and adjusted before being submerged, will be retained in those positions, and may be readily maneuvered and anchored after submersion. These and the other novel features of the present device cooperate in the production of an apparatus which is capable of making underwater photographs of a quality and beauty markedly superior to the results obtainable with apparatus of the character hitherto available.

Although only one specific form of device has been described and illustrated in the accompanying drawings, it will be obvious that the invention is not limited to the exact structure shown but is capable of a variety of mechanical embodiments. For example, it will be evident that the top and sides of the specimen chamber may be formed of various pervious materials other than netting which will enable the free flow of water therethrough, and that the netting or other material may be secured in place, either permanently or temporarily, by means other than the arrangement of rods illustrated. It will also be understood that the bottom of the specimen chamber may be formed similarly to the sides and top thereof, instead of by a transparent plate as shown, and that the shape and construction of the light shield may be varied from that illustrated, and may even be made telescopic, if desired. The camera mount may likewise be adapted to permit longitudinal, as well as transverse, movement of the camera in order to accommodate different sizes of lens.

Since there are various other changes which may be made in the form, details of construction and arrangement of the parts without departing from the spirit of the invention, some of which will now suggest themselves to those skilled in the art, reference should be had to the appended claims for a definition of the scope of the invention.

What is claimed is:

1. A submersible device of the type employing a camera with its lens for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be photographed and including means for varying the size of said chamber, and means interposed between said camera mounting means and said chamber for shielding the camera lens from light rays other than those approaching the lens from points lying within the normal field of view of the camera.

2. A submersible device of the type employing a camera with its lens for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be phtographed and including means for varying the size of said chamber, said chamber being so constructed and arranged as to permit the flow of water therethrough while still preventing the escape therefrom of the objects to be photographed, and means interposed between said camera mounting means and said chamber for shielding the camera lens from light rays other than those approaching the lens from points lying within the normal field of view of the camera.

3. A submersible device of the type employing a camera with its lens for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be photographed, certain of the walls of said chamber being of such construction as to permit the flow of water therethrough in a direction substantially perpendicular to the axis of the camera while still preventing the escape therefrom of the objects to be photographed, and means for preventing glare on the water between the camera and said chamber from interfering with the light rays passing from said chamber to the camera including light-shielding means interposed between the camera mounting means and said chamber and having means of communication with the body of water in which the device is submerged.

4. A submersible device of the type employing a camera with its lens for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be photographed, and means for preventing glare on the water between the camera and said chamber from interfering with the light approaching the camera from said chamber including a lightproof enclosure for the space between said camera mounting means and said chamber through which the objects in said chamber may be photographed, said enclosure having means of communication with the body of water in which it is submerged whereby it becomes filled with water when the device is submerged.

5. A submersible device for use in photographing underwater objects comprising a submersible unit adapted to be disposed in front of selected underwater scenery to provide the background for the picture to be made, said unit including a supporting frame, means for mounting a camera on said frame, and a chamber also mounted on said frame for confining the objects to be photographed, said chamber having transparent end walls through which the objects lying therebeyond in substantial alignment with said camera mounting means may be photographed as background for the objects within said chamber and other walls placing said chamber in communication with the body of water in which the device is submerged, at least a portion of said last named walls being movable for access to said chamber.

6. A submersible device for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be photographed, said chamber having transparent end walls through which may be photographed both the objects therewithin and those lying therebeyond in substantial alignment with said camera mounting means and other walls placing said chamber in communication with the body of water in which the device is submerged, at least one of the walls of said chamber being movable, and means to prevent glare on the water interfering with the light rays passage from said chamber to the camera.

7. A submersible device for use in photographing underwater objects comprising a supporting frame, means for mounting a camera on said frame, and a chamber also mounted on said frame for confining the objects to be photographed, said chamber having transparent end walls through which may be photographed both the objects therewithin and those lying therebeyond in substantial alignment with said camera mounting means, one of said end walls being movable relatively to the other to vary the distance therebetween and thereby vary the degree of restriction imposed upon movements of the objects within said chamber.

8. A submersible device for use in photographing underwater objects comprising a submersible unit adapted to be disposed in front of selected underwater scenery to provide the background for the picture to be made, said unit including a supporting frame, means for mounting a camera on said frame, and a chamber of substantially rectangular shape also mounted on said frame for confining the objects to be photographed, said chamber having its end walls substantially perpendicular to the axis of the camera and made of a solid transparent material, said chamber including means for varying the size thereof to predetermine the degree of restraint imposed on objects within the chamber, at least two of the other walls of the chamber being of such construction as to permit the flow of water between said transparent end walls, and light-shielding means interposed between the camera mounting means and said chamber.

9. A submersible device of the type employing a camera with its lens for use in photographing underwater objects comprising a submersible unit adapted to be disposed in front of selected underwater scenery to provide the background for the picture to be made, said unit including a supporting frame, means for mounting a camera on said frame, a chamber also mounted on said frame for confining the objects to be photographed and having means of communication with the body of water in which it is submerged, said chamber including means for varying the size thereof to predetermine the degree of restraint imposed on objects within the chamber, and means interposed between said camera mounting means and said chamber for shielding the camera lens from light rays other than those approaching the lens from points lying within the normal field of view of the camera and also having means of communication with the body of water in which it is submerged.

10. A submersible device of the type employing a camera with its lens for use in photographing underwater objects comprising a supporting frame, means for mounting a camera on said frame, a chamber also mounted on said frame for confining the objects to be photographed, said chamber having a transparent end wall through which the objects lying therebeyond in substantial alignment with said camera mounting means may be photographed as background for the objects within said chamber and other walls placing said chamber in communication with the body of water in which the device is submerged, means interposed between said camera mounting means and said chamber for shielding the camera lens from light rays other than those approaching the lens from points lying within the normal field of view of the camera and having means of communication with the body of water in which the device is submerged, and means carried by said frame in a position intermediate said shielding means and said end wall for illuminating the interior of said chamber.

11. A submersible device for use in photographing underwater objects comprising a supporting frame, means for mounting a camera on said frame, a chamber also mounted on said frame for confining the objects to be photographed, said chamber having transparent end walls through which may be photographed both the objects therewithin and those lying therebeyond in substantial alignment with said camera mounting means, one of said end walls being movable relatively to the other to vary the distance therebetween and thereby vary the degree of restriction imposed upon movements of the objects within said chamber, and lighting means movable with said movable end wall for illuminating the interior of said chamber.

12. An underwater photography device according to claim 1 wherein the frame includes wheels for facilitating movement of the device from one position to another and adjustable supporting legs for varying the elevation or inclination of said frame when in photographing position.

E. R. FENIMORE JOHNSON.